United States Patent [19]

McCabe et al.

[11] Patent Number: 4,655,039

[45] Date of Patent: Apr. 7, 1987

[54] LIFT SYSTEM

[75] Inventors: Paul P. McCabe; James Woolston, both of Greene, N.Y.

[73] Assignee: The Raymond Corporation, Greene, N.Y.

[21] Appl. No.: 746,843

[22] Filed: Jun. 20, 1985

[51] Int. Cl.[4] .............................................. F16D 31/00

[52] U.S. Cl. ........................................ 60/328; 60/433; 60/445; 60/459; 91/445; 91/459; 417/218

[58] Field of Search ................. 60/433, 445, 450, 452, 60/459, 328; 91/459, 445, 448; 417/26, 29, 63, 218, 222

[56] References Cited

U.S. PATENT DOCUMENTS

| | | | |
|---|---|---|---|
| 3,372,544 | 3/1968 | Kirkwood | 91/459 X |
| 3,385,169 | 5/1968 | Hale et al. | 91/459 X |
| 3,387,453 | 6/1968 | Suggs | 91/459 X |
| 4,074,529 | 2/1978 | Budzich | 60/452 X |
| 4,099,378 | 7/1978 | Shaffer | 60/433 X |
| 4,205,592 | 6/1980 | Haussler | 91/459 X |
| 4,375,747 | 3/1983 | Friedrich | 60/433 |

FOREIGN PATENT DOCUMENTS

| | | | |
|---|---|---|---|
| 3212002 | 3/1983 | Fed. Rep. of Germany | 60/433 |

*Primary Examiner*—Edward K. Look
*Attorney, Agent, or Firm*—Richard G. Stephens

[57] ABSTRACT

A hydraulic lifting and lowering system for battery-powered lift trucks includes an electronic control system which reduces or limits operator selected lifting commands in accordance with the current being drawn by an electric motor connected to drive a variable-displacement pump, and in accordance with the state-of-charge of the vehicle battery, to control a proportional valve which meters fluid flow to a lift cylinder.

11 Claims, 6 Drawing Figures

LIFT SYSTEM

Our invention relates to lift systems for battery-powered material-handling vehicles and like apparatus, and more particularly, to an improved lift system which is readily adjustable to perform lifting operations with better efficiency under a variety of operating conditions.

Various material-handling devices such as lift trucks employ piston-cylinder hydraulic actuators, or rams, to lift and lower heavy loads at varying speeds controlled by an operator. In one common form of lift truck a variable-displacement pump is arranged to run at a nominal speed when a lifting operation is to occur, and pump displacement is controlled by the operator to control fluid flow rate to the actuator, thereby controlling the speed at which the load is lifted. On battery-powered lift trucks the hydraulic pump is ordinarily driven at the nominal speed by an electric motor which is switched on by the operator when a lifting operation is desired. In the case of battery-powered lift trucks it is especially desirable that the electric motor-hydraulic pump combination operate as efficiently as possible, since much of the power stored in the truck battery is usually used for lifting operations.

While a given motor and a given lift pump readily may be selected to provide maximum power efficiency when lifting a given weight of load at a given speed with a given battery charge, material handling operations ordinarily require that a wide variety of load weights be lifted at many different lifting speeds with widely differing battery charge conditions.

If one selects for installation on a truck a motor-pump combination which operates at peak efficiency when a load of average weight is lifted at an average speed, the efficiency will be less when a very light load or a very heavy load is lifted, and it may become very poor when a heavy load is raised at a high speed, and serious overheating of the motor can occur. U.S. Pat. No. 3,834,494 illustrates a system wherein lift cylinder pressure is used to hydraulically limit the range over which the operator can vary pump displacement, thereby limiting the speed at which a load can be raised in dependence upon the weight of the load. While that prior system can prevent an operator from lifting very heavy loads, except at low speeds, it fails to provide good motor efficiency under many operating conditions. The lift motor operates at its peak efficiency for a given torque loading when a predetermined voltage is applied to the motor. The voltage available from the battery to run the lift motor unfortunately does not remain at a predetermined value, however. The terminal voltage of the battery at a given instant is less than the open circuit voltage of the battery by an amount proportional to the battery current being drawn at the given instant, by virtue of the internal resistance of the battery, and the open circuit voltage of the battery itself decreases by a substantial amount as the battery state varies from one of full charge to a nearly discharged state.

One general object of the present invention is to provide a battery-powered hydraulic lifting system having an electric motor driving a variable-displacement group wherein the motor and hydraulic system operate nearer their peak efficiencies under varied operating conditions. In accordance with the present invention, the voltage applied to the lift pump motor is maintained near the ideal motor voltage by controlling hydraulic flow as a function of motor current and battery state-of-charge to control torque loading on the motor, and provision of a battery-powered hydraulic lifting system having such control is another object of the invention. The pump motor current is a much better measure of actual torque loading on the motor than pressure at a lift cylinder, particularly in a dynamic sense.

If attempts are made to lift heavy loads when a truck battery has a low state of charge, the battery may be permanently damaged. It has been common to provide battery charge sensors which either illuminate a warning light, or which disable a truck lifting system when the battery charge falls below a predetermined level, as is shown in U.S. Pat. No. 3,389,325 for example. The mere use of a warning light tends to be ineffective, because it often may be ignored by a careless or indifferent operator. Arrangements which completely disable a truck lifting system at a given battery charge level are unsatisfactory in that they render a truck which may constitute a large capital investment essentially worthless until its battery can be recharged or replaced. Irrespective of whether a battery discharge indicator is used to illuminate a warning light or to disable the truck, the use of some predetermined level of battery charge as a warning or as a disablement signal is unsatisfactory. A battery which is partially discharged to a given state-of-charge might be seriously damaged if attempts were made to do further lifting of very heavy loads at high speeds, yet be completely capable of lifting lighter loads or of lifting loads at lower speeds, with no danger of battery damage. If a truck having such a battery is completely disabled, the result is waste. One important concept of the present invention is that lifting speeds which an operator can command should be limited not solely in dependence upon load weight, nor solely in dependence upon battery state-of-charge, but rather in accordance with a combination of those factors, over substantial ranges of variation of those factors. Thus one important object of the present invention is to provide a battery-powered hydraulic lifting system in which the lifting speed which can be commanded is limited both as a function of the weight of the instantaneous load being lifted and as a function of the current state-of-charge of the battery.

Some lift truck users must move materials as rapidly as possible, with little concern for how long a battery can be used, while other users would principally prefer that a truck battery be usable throughout an entire 8-hour work shift, for example, with less concern that loads be stored and retrieved very rapidly. Another object of the invention is to provide a battery-powered hydraulic lifting system which is readily adjustable or programmable for use at improved efficiency with different electric motors and different hydraulic pumps, and widely differing lift truck applications.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

U.S. Pat. No. 3,570,243 also may be of interest as prior art.

Figure 1:
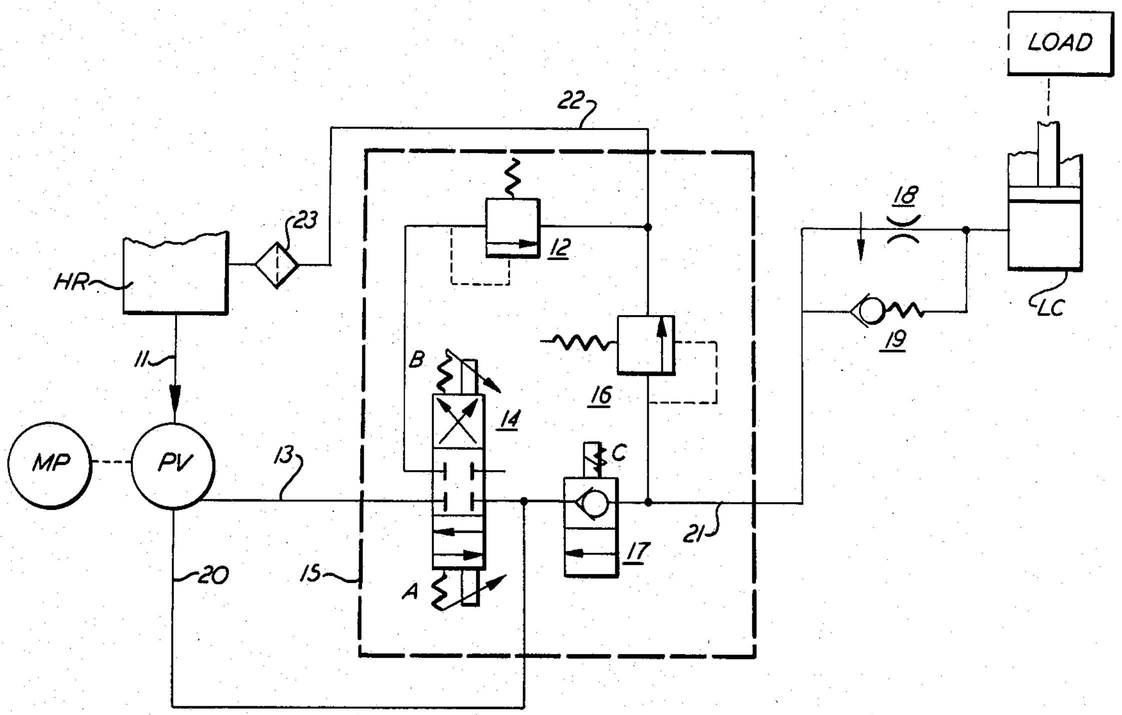
FIG. 1 is a hydraulic schematic diagram illustrating portions of an exemplary embodiment of the invention.

Reference now may be had to FIG. 1. Pump motor MP is arranged, as will be shown below, to start and to run at a generally constant speed whenever the operator displaces a control member from a neutral position to perform a lifting operation, and motor MP is connected to drive variable-displacement pump PV. Pump PV draws hydraulic fluid from hydraulic reservoir HR through line 11 in an amount depending upon the instantaneous displacement setting of the pump. Pump PV preferably comprises a pressure and flow compensated pump, and it may comprise, for example, a Model L-23 open circuit pump marketed by Sundstrand Corporation, Ames, Iowa. Motor MP may comprise, for example, a No. 5BT 1343B27 series-compound motor available for General Electric Company.

A spring (not shown) within pump PV urges a swash plate toward a full-displacement position, and the difference between pump output pressure and the pressure in a sense line 20 connected to the pump urges the swash plate toward a zero-displacement position. If the pump output pressure exceeds the sense line pressure by a selected differential pressure amount, such as 200 psi, the swash plate is moved to the zero-displacement position. As motor MP starts to run to commence a lifting operation, pump PV initially attempts to force fluid through line 13 and through a proportional lift-lower valve 14. If the valve is initially closed, the pressure in line 13 will rapidly rise to 200 psi, and pump displacement will become zero. If a substantial load is carried on lift cylinder LC, a substantial pressure (e.g. 2000 psi) will exist in line 21 and in sense line 20, and hence the pump displacement will be adjusted so that the pressure in line 13 will rise to a value near 2200 psi. Assuming that valve 14 then is open some amount, the pressure in line 13 then will exceed that in lines 21 and 20, and fluid will flow through proportional valve 14 and past check valve 17 into line 21 and cylinder LC.

Valve 14 is an electrically-operated proportional directional valve, and it may comprise, for example, a Double A Model No. VPQF-SM-OL-S3-10A1-DC24 valve available from Double A Division of Brown and Sharpe Co., Manchester, Mich. To provide a lifting operation, valve ports are moved upwardly as viewed in FIG. 1, so that fluid from line 13 will flow through valve 14, and through the check valve portion of a then de-energized solenoid valve 17, thence through line 21 and past check valve 19 into lift cylinder LC. The pressure downstream from lift valve 14 at line 21 is connected through sense line 20 to control the displacement of pump PV. The amount of fluid which flows through valve 14 is proportional to the average magnitude of the current applied to electrical operating coil A of valve 14. When spool valve coil A is energized and fluid is flowing through valves 14 and 17, sense line 20 carries the pressure in line 13, less the pressure drop across valve 14. That pressure drop depends upon the flow rate through those valves. The displacement of pump PV will be automatically adjusted so that the output pressure of the pump is the "effective" load pressure, plus the selected differential pressure (e.g. 200 psi), where effective load pressure is the pressure at cylinder LC due to the static load weight plus system pressure drops occurring in line 21 for example, such drops being dependent, of course, on flow rate.

In order to force fluid into cylinder LC to provide lifting, the pressure in line 21 manifestly must exceed the pressure in that cylinder, and the output pressure of pump PV at line 13 must exceed that in line 21. The pressure in lift cylinder LC and that in line 21 depend, of course, upon the weight of the load being supported by the lift cylinder, and pressure drops due to flow in line 21 and the connections to the lift cylinder. In typical applications the load weight will vary at different times over a large range, say from 400 to 4000 pounds. Thus the pressure seen by pump PV will vary widely during lifting operations, irrespective of the speed at which lifting is made to occur.

Solenoid valve 17, which may be termed a "load-holding" valve, is provided to prevent load weight from forcing fluid backward through valve 14 to line 13 during the time after a lifting operation has been terminated until the time at which a subsequent lowering or lifting operation is commenced. When a lowering operation is performed, the solenoid of valve 17 is energized to allow fluid flow from the lift cylinder and line 21 to and through valve 14. A hydraulic restriction 18 connected to the base of the lift cylinder is essentially inactive while lifting occurs, the fluid from line 21 passing into cylinder LC via check valve 19. Line 21 comprises one or several hydraulic hoses in most applications, and such hoses sometimes fail. If a hose fails, restriction 18 limits the flow rate out of cylinder LC, preventing a dangerously fast dropping of the load. The use of load-holding valve 17 and restriction 18 for such purposes is by no means new.

When the operator moves a control to command lowering of the load, the port of valve 17 is moved upwardly as viewed in FIG. 1, allowing fluid flow from line 21 through valve 17 to valve 14, and coil B of valve 14 is energized to move ports in valve 14 downwardly as viewed in FIG. 1. Then fluid from cylinder LC and line 21 will flow through valve 14, in an amount dependent upon the average current applied to coil B of valve 14, and thence through valve 12, line 22 and filter 23 to reservoir HR.

If the pressure in line 21 ever exceeds a dangerous predetermined amount, which might occur by reason of the operator trying to lift too heavy a load, or by truck lift forks becoming stuck in a storage rack, for example, high-pressure relief valve 16 operates to limit pressure and return fluid to the reservoir.

During a lowering operation, a valve 12 remains closed until the pressure in the fluid applied to it from valve 14 exceeds a predetermined value. Such an arrangement prevents hydraulic fluid from draining out of hydraulic lines if a lowering operation is attempted with the truck load forks resting on a storage rack, for example, so that the load cannot lower. If fluid were allowed to drain during such conditions, subsequent removal of the forks from whatever was preventing their descent could result in a dangerous sudden descent of the load.

Figures 1, 2:
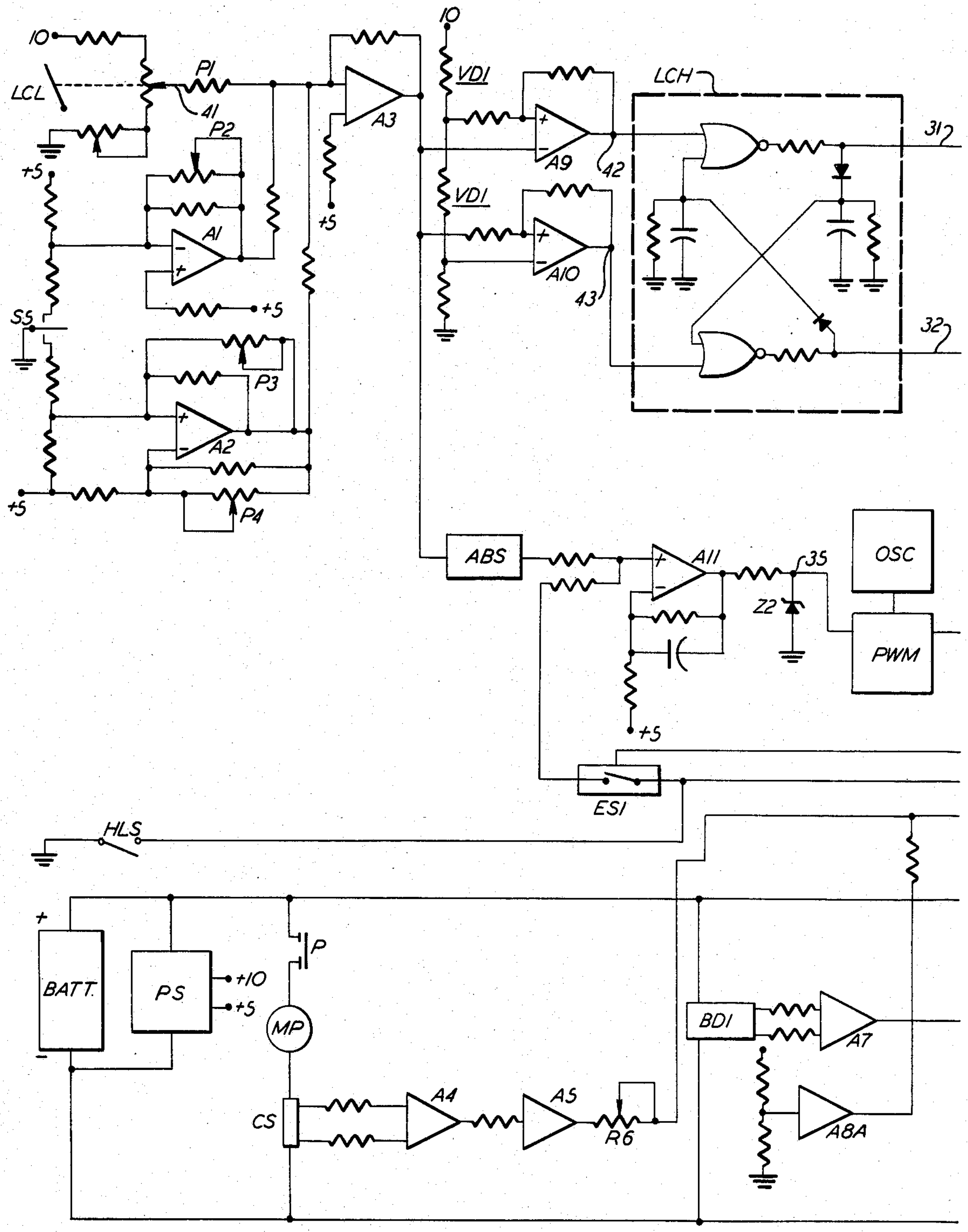
FIG. 2 is a diagram illustrating how FIGS. 2-1 and 2-2 fit together to form an electronic schematic diagram, partially in block form, illustrating various electronic and electrical portions of the exemplary embodiment of the invention.
Figure 2:
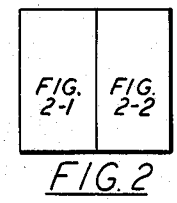
Figure 2:
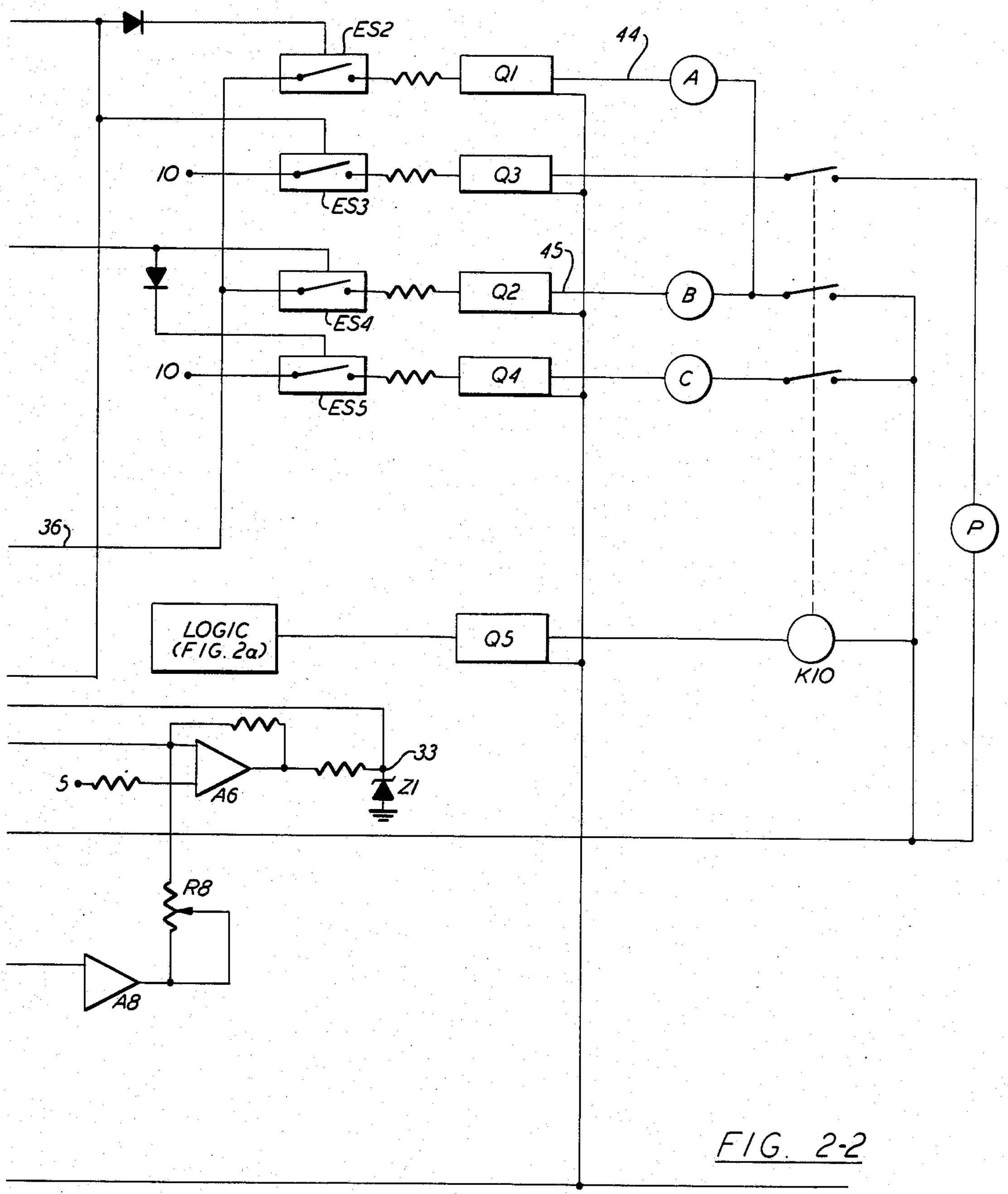
Figure 2A:
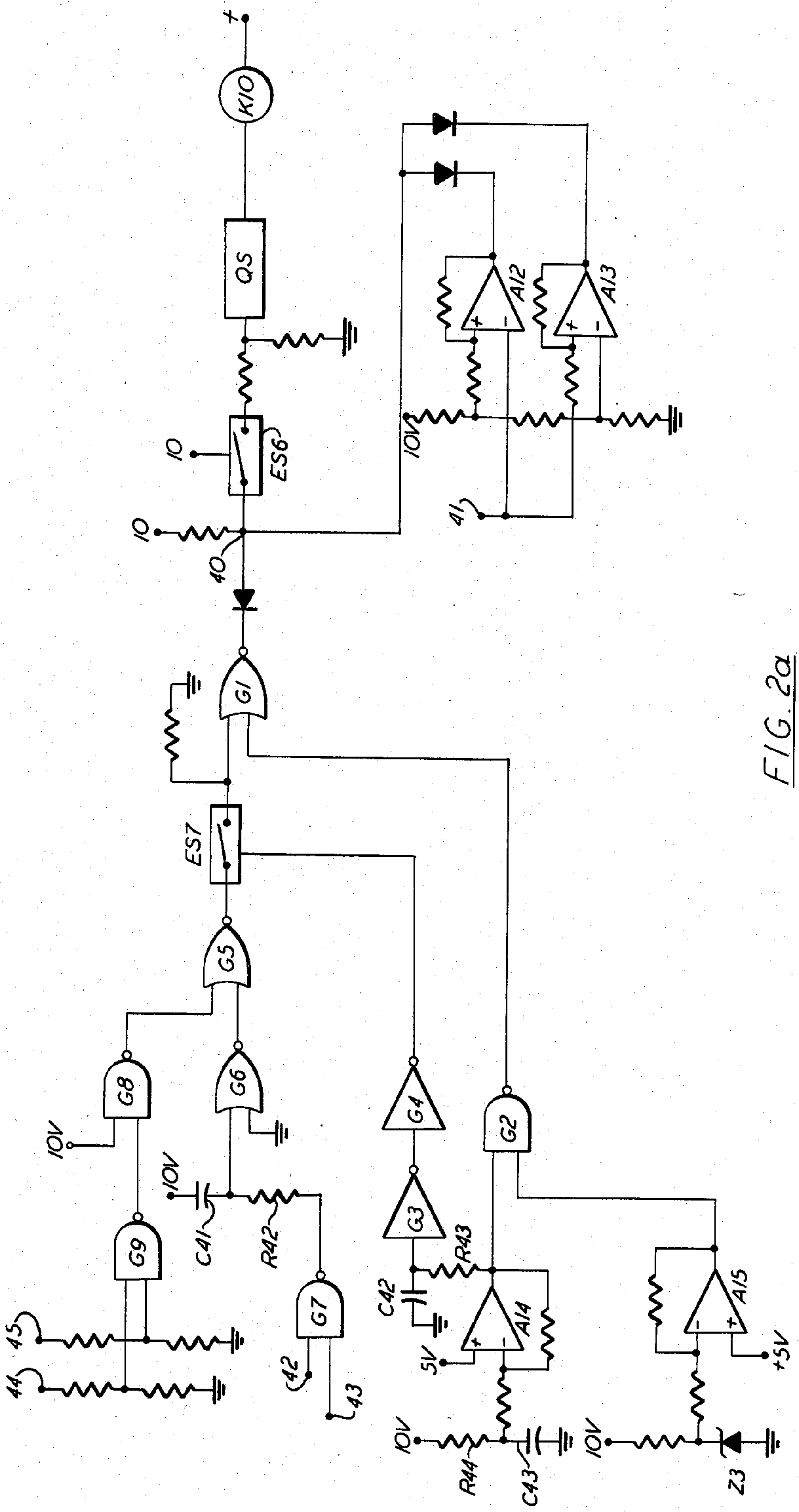
FIG. 2a is an electronic and logic circuit diagram illustrating some portions of the preferred embodiment shown in block form in FIG. 2.

In FIG. 2-1 a conventional power supply PS containing filtering and voltage regulator circuits is connected to the truck battery BATT and provides +10 volt and +5 volt voltages above a ground voltage. The 5-volt level is used as a reference level above and below which various voltages may vary to provide direction as well as magnitude information. Lifting and lowering is principally controlled by operator manipulation of a lift control lever LCL when the truck is not moving. In many applications it is desirable that an operator be enabled to do limited lifting and lowering while the truck is moving. To that end a travel lift-lower switch S5 is provided on the operator's vehicle speed control lever (not shown). The operator may operate switch S5 to a "lift" or "lower" position with his thumb to provide lifting or lowering with the same hand as he uses for vehicle speed control while the truck is traveling, while his other hand is busy steering. In FIG. 2-1 the wiper arm of potentiometer P1 is connected to be operated by lever LCL, which is spring-biased toward a central or neutral position. When lever LCL is centered, amplifier A3 provides the 5-volt reference output. When control LCL is moved to call for lifting or lowering, as when the truck is not traveling, the output of amplifier A3 is raised above or lowered below the 5-volt reference level, respectively.

Switch S5 is a spring-centered momentary switch. If while the truck is traveling, the operator moves switch S5 to the lift position, a voltage from amplifier A2 drives the output of amplifier A3 to a predetermined level above 5 volts, and conversely, moving switch S5 to the lower position causes a voltage from amplifier. A1 to drive the output of amplifier A3 to a predetermined level below 5 volts. The speeds at which lifting and lowering should be allowed to occur so as to provide efficient but safe material-handling operations may vary widely between different types of trucks and different warehouse environments. To allow the control system of the present invention to be used on a variety of trucks under widely differing conditions, the amounts which operator manipulation of switch S5 vary the output voltage from amplifier A3 are preferably made adjustable, preferably by adjusting the gains of amplifiers A1 and A2. In the circuit of FIG. 2-1 the gains of amplifiers A1 and A2 can be adjusted by adjustment of potentiometers P3 and P4. Switch S5 and amplifiers A1 and A2 might be omitted, of course, in some applications of the invention. In any event, amplifier A3 will be seen to provide an output voltage commensurate with a desired lifting effort. The amount which the operator moves control LCL for lifting or lowering is better termed commensurate with lifting and lowering "effort" than lifting or lowering "speed", since the lifting or lowering speed which a given deflection of control LCL will provide tends to vary widely, depending on load weight and other factors.

The output voltage of amplifier A3 is applied to a window comparator comprising comparator amplifiers A9 and A10. Amplifiers A9 and A10 are biased from a voltage divider VD1 so that both of those amplifiers provide high (positive) output signals when the command voltage from amplifier A3 is at or near the 5-volt reference level. If the operator moves a control to call for lifting, raising the output of A3 above 5.5 volts, comparator A9 switches to provide a low (near zero) voltage, setting latch LCH, and conversely, if the operator moves a control to call for lowering, lowering the output of A3 below 4.5 volts, comparator A10 switches to provide a low logic voltage, clearing latch LCH. Latch LCH comprises a pair of cross-coupled NOR gates, and is conventional except in that it includes RC time-delay circuits on two of the NOR gate inputs, to delay the rate at which the operator can switch the latch, should he rapidly move a control between lifting and lowering conditions. When latch LCH is set, its output terminal 31 is at a logic 1 level, which enables or closes three electronic switches (ES2, ES3 and ES1, see FIG. 2-2) for lifting, and when latch LCH is reset or cleared, its output terminal 32 is at a logic 1 level, which enables electronic switches ES4 and ES5 for lowering. The output of amplifier A3 is also applied to a conventional absolute value or "precision rectifier" circuit ABS (FIG. 2-1). The absolute value circuit provides an output voltage which varies above the 5-volt reference level by the amount that its input voltage varies either above or below that reference level.

When the operator moves a control to call for lifting, motor MP is connected across battery BATT in series with a current shunt CS, by energization of a contactor P, as will be seen below. The voltage across shunt CS is proportional to the amount of current being drawn by motor MP, and it is applied to a differential amplifier A4, the output of amplifier A4 is amplifier by amplifier A5, and the output of amplifier A5 is applied to amplifier A6 through a variable resistance R6. When motor current is zero, the output of amplifier A5 lies at the 5-volt level, and as motor current increases the output voltage of amplifier A5 increases proportionally above the 5-volt level, tending to decrease the amplifier A6 output.

A battery discharge indicator BDI is also connected across battery BATT, and it provides an output voltage commensurate with the state-of-charge of the battery, such as a voltage of 5 volts when battery BATT is fully charged, and a voltage near zero when the battery is nearly discharged. The battery discharge indicator may comprise, for example, a Model 933 ampere hour meter or microcoulometer commercially available from Curtis Instruments, Inc., Mount Kisco, N.Y. The output voltage from indicator BDI is applied to differential amplifier A7. The output of amplifier A7 is applied to amplifier A8, and the output voltage of amplifier A8 is applied via adjustable resistance R8 to amplifier A6, to be summed with the signal representative of motor current. As the output of indicator BDI decreases, indicating discharge of the battery, the output of amplifier A8 increases, tending to decrease the output of amplifier A6.

When motor current is zero and the battery is fully charged, the inputs to amplifier A6 drive the output of amplifier A6 to approximately 6 volts, but zener diode Z1 conducts under such conditions to hold the voltage at terminal 33 to the 5-volt reference level. Thus it will be seen that amplifier A6 provides a voltage which varies below the 5-volt reference level in accordance with pump motor current and battery state-of-charge.

If the load carriage (not shown) of the truck nears the upper end of the truck mast (not shown) height limit switch HLS (FIG. 2-1) carried on the mast is closed, grounding terminal 33 and preventing further lifting.

The setting of latch LCH at the start of the lifting operation closes electronic switch ES1, applying the output voltage of amplifier A6 to the input circuit of amplifier A11 to sum that voltage with the output voltage of the absolute value circuit. Thus during a lifting operation when the operator has moved control LCL, the output voltage of amplifier A11 is proportional to the amount he has moved control LCL from its centered position, less an amount proportional to pump motor current, and less a further amount dependent upon the battery state-of-charge. It will be apparent at this point that the amounts by which lift motor current and battery decay reduce the output voltage of amplifier A11 can be readily adjusted by mere adjustments of potentiometers R6 and R8, and as will become clear below, those amounts will control displacement of spool valve 14 and allow the lifting system to be readily tailored to suit different desired material handling procedures.

A free-running oscillator, which may comprise a Type 556 timer, for example, provide 100 microsecond pulses at a repetition rate of approximately 260 hertz to repeatedly trigger a pulse width modulator PWM, which also may comprise a Type 556 timer. Zener diode Z2 prevents the voltage at terminal 35 from exceeding the upper operating limit of circuit PWM. The voltage at terminal 35 is connected to control the threshold voltage at which circuit PWM switches, and hence the output voltage on line 36 comprises pulses at a 260 hertz repetition rate having a duty-cycle commensurate with the voltage of terminal 35. The pulses are connected to electronic switches ES2 and ES4. During a lifting operation switch ES2 is closed, by reason of latch LCH having been set, and the pulses are applied via relay driver circuit Q1, to energize coil A of spool valve 14, assuming that relay K10 is energized. During a lowering operation switch ES4 is closed, by reason of latch LCH having been reset, and the pulses are instead applied via relay driver circuit Q2, the energize coil B of the spool valve, assuming that relay K10 is energized. In either case spool valve 14 is displaced from its centered position in proportion to the average current in the coil being energized, thereby controlling the fluid flow through the spool valve.

The setting of latch LCH during a lifting operation also closes electronic switch ES3, thereby energizing the coil of contactor P via relay driver Q3, (assuming that relay K10 is energized) and the closing of contacts of contactor P energize motor MP. The resetting of latch LCH during a lowering operation closes electronic switch ES5, applying voltage via relay driver circuit Q4 to energize the coil C of load-holding valve 17, thereby to allow fluid to flow from the lift cylinder. Each of the relay driver circuits may comprise a conventional Darlington driver amplifier having a diode and a varistor connected across its output terminals to protect it against inductive transients emanating from the relay it drives. In order for spool valve coil A and the coil of contactor P to be energized for lifting, or in order for spool valve coil B and coil C of valve 17 to be energized for lowering, relay K10 must be energized. The energization of relay K10 is controlled by various logic circuits shown in FIG. *2a.*

As shown in FIG. *2a*, electronic switch ES6 applies voltage to relay drive Q5 to energize relay K10 whenever 10 volts is available from the power supply (PS in FIG. 2), assuming that terminal 40 is not pulled down by conduction of one or more of the three diodes shown connected to terminal 40. The voltage at terminal 41 on the wiper arm of potentiometer P1 (FIG. 2) is applied to a window comparator comprising amplifiers A12 and A13, and during normal operation the outputs of these amplifiers are both positive. If an open circuit should occur in the P1 potentiometer circuit above or below the wiper arm, the voltage at terminal 41 will fall to zero or rise to 10 volts, causing the output of amplifier A13 or amplifier A12 to swing negative, pulling down terminal 40 to disable relay K10.

Relay K10 also will be de-energized if a logic 1 signal is applied to either input line of nor gate G1. After a brief (e.g. 1 second) power-up period electronic switch ES7 will be closed. At any time thereafter relay K10 will be de-energized to prevent lifting and lowering operations if a logic 1 signal is applied to switch ES7 from nor gate G5. The output voltages of relay drivers Q1 and Q2 at terminals 44 and 45 are connected via respective voltage dividers to nand gate G9. With relay K10 closed, no modulation will be applied to those relay drivers after the lifting controls are centered, and the voltages at terminals 44 and 45 both will lie at the battery positive terminal voltage, assuming that the output transistor of neither driver is shorted. A short would cause a very low or zero voltage at a driver output terminal. If one or both of the drivers is shorted, gates G9 and G8 cause a high output from gate G5 to disable relay K10, unless a high output from gate G6 forces the gate G5 output low. Nand gate G7 is connected to the output voltages of comparators A9 and A10 (FIG. 2) at terminals 42 and 43, causing a high output from gate G6 until shortly after each time the lifting controls are centered, capacitor C42 and resistor R43 briefly delaying the fall of the G6 output as the controls are centered, to insure that the drivers are fully turned off. Thus a checking for a driver malfunction occurs each time the lifting controls are in the centered condition, and further lifting or lowering is prevented if a malfunction is detected.

When power is first turned on, and the supply voltages are rising, resistor R44 and capacitor C43 cause a time delay, after which gates G2 and G1 and relay K10 are energized, and then after a further time delay implemented by resistor R43 and capacitor C42, switch ES7 is closed, via logic inverters G3 and G4. If, during operation, the 10-volt supply voltage should go to high by reason of some circuit malfunction or component failure, the amplifier A15 output voltage disables gate G2, causing relay K10 to be de-energized, thereby preventing any further lifting or lowering. If, on the other hand, the 10-volt supply level falls too low, the lowered voltage applied to driver Q5 from switch ES6 will drop out relay K10.

Figure 3:
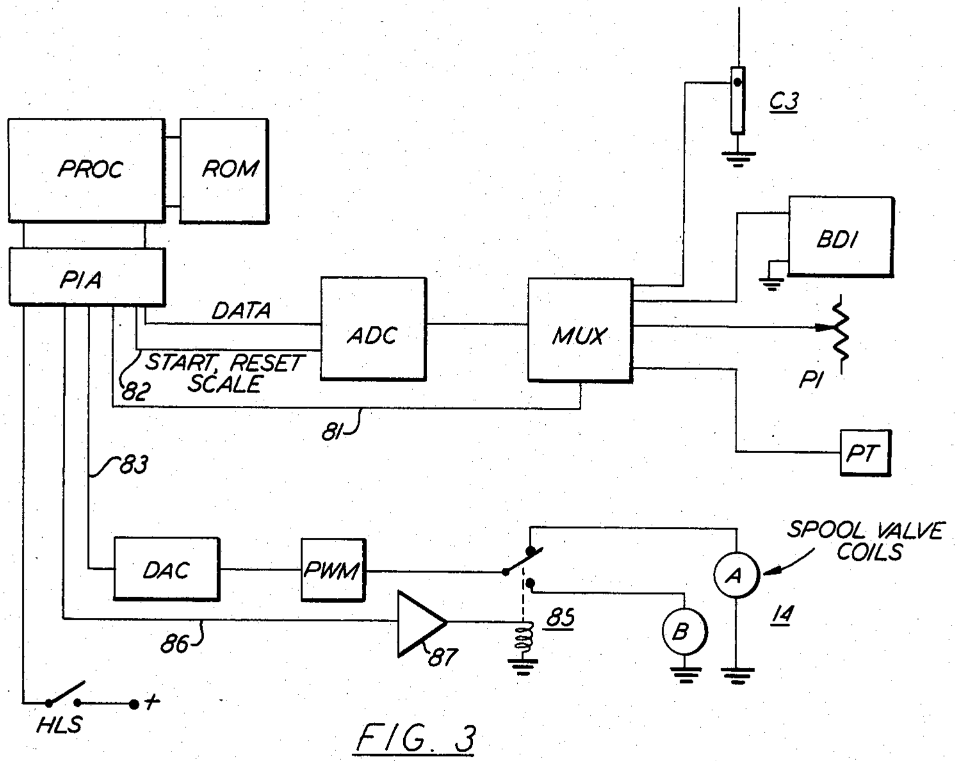
FIG. 3 is a diagram, largely in block form, illustrating an alternative form of control system which may be used with the hydraulic system of FIG. 1.

In a modification of the invention partially illustrated in FIG. 3, a microprocessor PROC is connected to truck circuits via a plurality of peripheral interface adapters represented by block PIA. The control program stored in memory ROM causes outputs on lines represented by line 81 to operate switching circuits, represented by block MUX, to successively and repeatedly connect a number of analog voltage signals to the analog input circuit of a conventional analog-to-digital converter ADC. Further outputs on lines represented by line 82 start, stop and scale the analog voltages applied to converter ADC. Switching circuit MUX is shown connected to sample analog voltages from the pump motor current shunt CS, battery discharge indicator BDI, and the lift control potentiometer P1. Closure of height limit switch HLS applies a logic signal to a PIA input circuit. Based on the input data supplied, the program in ROM causes processor PROC to calculate a proper spool valve displacement, and the digital signal on lines represented by line 83 operates a conventional digital-to-analog converter DAC to provide an analog voltage. The analog voltage is shown connected through a pulse width modulator PWM to a relay 85. A further output on line 86 is applied via driver 87 to the operating coil of the relay, to select which coil of the spool valve the analog voltage will be applied to, to provide both lifting and lowering. It is to be understood that the spool valve so controlled is that of an hydraulic system of the same type as that shown in FIG. 1.

In FIG. 3 an added optional feature comprises a pressure transducer PT which is connected to provide a signal commensurate with the pressure in the lift cylinder. The pressure signal applied to the processor may be used to limit lowering speeds, and to limit spool valve displacement to a predetermined maximum amount when the pressure exceeds a desired level.

While the means for commanding a desired lifting speed have been shown as a manually-controlled potentiometer or switch, it will be apparent that in various applications, such as riderless vehicles, such means may take a variety of different forms, and include wire or wireless communication from a remote location, for example.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property, or privilege is claimed are defined as follows:

1. In a battery-powered hydraulic lifting system which includes an electric battery, an electric motor, a hydraulic pump, hydraulic motive means, and first control means for commanding a desired lifting effort, said electric motor being electrically connected to be powered by said battery and mechanically connected to drive said hydraulic pump, and said hydraulic pump being hydraulically connected to drive said hydraulic motive means; the improvement comprising: a proportional valve connected between said pump and said hydraulic motive means to control flow of hydraulic fluid between said pump and said motive means; means responsive to said first control means for deriving a first signal commensurate with a commanded lifting effort; means for deriving a second signal commensurate with the state of charge of said electric battery; and second control means responsive to said first signal and said second signal for adjusting said proportional valve.

2. The system according to claim 1 having means for deriving a third signal commensurate with current drawn by said electric motor, said second control means being responsive to said first, second and third signals for adjusting said proportional valve.

3. The system of claim 2 having means for adjusting the amount which said third signal varies with variation in said current drawn by said electric motor.

4. The system according to claim 2 in which said first signal is operative to increasingly open said proportional valve as said commanded lifting effort increases, said third signal is operative to decrease the opening of said valve as said current increases, and said second signal is operative to decrease the opening of said valve as the state of charge of said battery decreases.

5. The system of claim 2 wherein said first, second and third signals comprise electrical signals, and said second control means comprises means for summing said first, second and third signals to provide a fourth signal, and means for pulse width modulating said signal to control said proportional valve.

6. The system of claim 1 having means for adjusting the amount which said second signal varies with variation in said state of charge of said battery.

7. The system according to claim 1 wherein said hydraulic pump comprises a variable-displacement pump, and wherein said system includes means for controlling the displacement of said pump in response to the pressure at the output of said proportional valve.

8. The system of claim 1 wherein said means responsive to said first control means is operative to derive a first signal alternatively commensurate with a commanded lifting effort or a commanded lowering effort, said system includes means for deriving a signal commensurate with the pressure at said hydraulic motive means, and said second control means is responsive to said first signal commensurate with a commanded lowering effort and said second signal for adjusting said proportional valve.

9. The system of claim 1 having a two-way normally-closed solenoid valve connected in series with said proportional valve between said pump and said hydraulic motive means, and means for operating said solenoid valve to allow hydraulic fluid to flow from said motive means through said solenoid valve and said adjustable valve, wherein adjustment of said proportional valve may control lowering of a load supported by said motive means.

10. The system of claim 1 wherein said hydraulic motive means comprises a piston-cylinder assembly connected to raise and lower a load by extension and retraction of said assembly.

11. In a battery-powered hydraulic lifting system which includes an electric battery, an electric motor, a hydraulic pump, hydraulic motive means, and first control means for commanding a desired lifting effort, said electric motor being electrically connected to be powered by said battery and mechanically connected to drive said hydraulic pump, and said hydraulic pump being hydraulically connected to drive said hydraulic motive means; the improvement comprising: a proportional valve connected between said pump and said hydraulic motive means to control flow of hydraulic fluid between said pump and said motive means; means responsive to said first control means for deriving a first signal commensurated with a commanded lifting effort; means for deriving a second signal commensurate with current drawn by said electric motor; and second control means responsive to said first and second signals for adjusting said proportional valve.

* * * * *